United States Patent [19]

Lima et al.

[11] Patent Number: 5,328,104
[45] Date of Patent: Jul. 12, 1994

[54] PROCESS FOR RECYCLING CONTAMINATED DRUMS

[75] Inventors: William Lima, Monmouth Beach; Earl V. Lind, Brick; Philip D. Bartlett, Holmdel, all of N.J.

[73] Assignee: Russell-Stanley Corporation, Red Bank, N.J.

[21] Appl. No.: 63,636

[22] Filed: May 18, 1993

Related U.S. Application Data

[63] Continuation of Ser. No. 824,056, Jan. 23, 1992, abandoned.

[51] Int. Cl.$^5$ .................. B02C 19/12; B02C 21/02
[52] U.S. Cl. .................. 241/24; 241/29; 241/101.7; 241/DIG. 38
[58] Field of Search .......... 241/DIG. 38, 25, 29, 241/101.7, 24

[56] References Cited

U.S. PATENT DOCUMENTS

| | | | |
|---|---|---|---|
| 2,853,240 | 9/1958 | Mahoney, Jr. | 241/DIG. 38 |
| 3,660,038 | 5/1972 | Brewer | 241/DIG. 38 |
| 3,826,437 | 7/1974 | Warren, Jr. et al. | 241/DIG. 38 |
| 4,786,003 | 11/1988 | Johnson | 241/101.7 |
| 4,852,815 | 8/1989 | Giannotti | 241/65 |
| 4,961,539 | 10/1990 | Deem | 241/36 |
| 5,060,870 | 10/1991 | Trezek et al. | 241/19 |
| 5,143,308 | 9/1992 | Hally et al. | 241/76 |
| 5,169,588 | 12/1992 | Estepp | 264/331.17 |
| 5,251,832 | 10/1993 | Hentschel | 241/101.7 |

OTHER PUBLICATIONS

Earl V. Lind, "Declaration of Earl V. Lind", dated May 26, 1992.
Stan Kiste, "Collecting and Processing Plastic Dairy Containers", Resource Recycling, Jul. 1988, vol. VII, No. 3, pp. 34-35 and 63-64.

*Primary Examiner*—Mark Rosenbaum
*Assistant Examiner*—John M. Husar
*Attorney, Agent, or Firm*—Hedman, Gibson & Costigan

[57] ABSTRACT

A system and method to shred, transport and reconstruct plastic drums. The drums are loaded into a shredding apparatus that shreds the drums into shreddings. The shreddings are then projected into a compartment in a storage means in a trailer. The loaded storage means is transported to a remote location to be further ground and pelletized for construction into new drums.

16 Claims, 2 Drawing Sheets

PROCESS FOR RECYCLING CONTAMINATED DRUMS

This application is a file wrapper continuation application of U.S. application Ser. No. 07/824,056, filed Jan. 23, 1992 now abandoned.

FIELD OF THE INVENTION

This invention relates to a process for recycling rather than reconditioning drums that are used to store and transport materials.

BACKGROUND OF THE INVENTION

Liquids and other fluidizable materials have long been shipped and stored in drums. Fifty five gallon drums formed of steel have been used for many years. More recently fifty five gallon drums formed of plastic materials have become common. Flexible drum liners that protect the drum interior from contact with the fluid are now beginning to be used. Although the drums with flexible liners are intended to avoid contact between the drum and the drum contents, some residuals from the hazardous liquids, materials or oils can leak or seep into contact with the drums.

As a result of the possible leakage of hazardous liquids, materials or oils the drums, whether steel or plastic, have customarily been reconditioned before being reused. In effect, an entire industry exists to remove all traces of the contents of the drums and safely dispose of the contents. Further, the chemicals used to properly clean the drums are often strong and harsh in nature. These chemicals also pose a risk to the environment.

In view of the hazardous nature of many of the liquids found in the drums and the chemicals used to recondition the drums, the problem of disposing of the contents in the drums and the liquids used to recondition the drums in an ecologically safe manner has arisen. Consequently, destroying and recycling the drum instead of reconditioning the drum is less detrimental to the environment because the harsh chemicals which damage the environment are not needed.

SUMMARY OF THE INVENTION

This invention is directed to a process for recycling rather than reconditioning contaminated drums.

To this end, a process for destroying, transporting and reconstructing the containers or drums in which hazardous liquids, materials, lubricating oils and related products, were stored comprises the steps of loading the drums into means for shredding the drums; shredding the drums; loading the shreddings into a means for storing shredded material; transporting the means for storing shredded material to a remote location; and reconstructing the shreddings into new drums.

The steps of loading the drums into the shredding means, shredding the drums, and loading the shreddings into the storage means are all accomplished by a shredding apparatus. The apparatus used is a wood tree chopper such as those available under the tradename of "AS-PLUNDH" or "WISPER". The shredding means is located on a mobile platform which allows it to be moved to various locations in a single complex. The loading of the drums into the shredding means can be performed either manually or automatically via a fork lift onto a conveyor or chute.

During the shredding of the drum, depending on the type of material of which the drum is made and the size of the shreddings wished to be obtained, the cutting mechanism of the shredding means may need to be varied. Additionally, a liquid such as a water and oil mixture may be sprayed onto the cutting mechanism during the shredding of the drum to help reduce any friction between the cutting mechanism and the drum.

As for the means for storing the shreddings, a trailer divided lengthwise into compartments for various shreddings to be placed is provided. The trailer has a floor which has numerous small apertures and which slants to a center drain to allow excess residual liquids on the shreddings to drain into an overflow pan under the floor of the storage means. There is also an overflow pan located under the shredding means for the same purpose. The trailer also has fastening means in both the front and rear of the trailer which enable the trailer to remain in position while shreddings are loaded into the trailer and allow the trailer to be removed when the trailer has been filled with shreddings. The storing means and the shredding means are connected in alignment to facilitate selective loading of the shreddings into a particular compartment in the storing means.

The loading of the shreddings into the trailer compartments is performed by a blower forcing the shreddings through a conduit. The conduit has an elbow to enable the shreddings to be directed into the appropriate compartment in the trailer. After the shreddings have been loaded into the storing means the step of draining excess residual liquids and materials from the shreddings occurs. It may also be necessary to drain the excess residual liquids again when the storing means has arrived at its final destination.

Once the storing means is filled to capacity another storing means is put in its place and the storing means which is filled is transported to a remote location where the shreddings are vacuumed out of the storing means and the steps of rinsing and further grinding the shreddings occurs after which the shreddings are reconstructed into new drums.

DESCRIPTION OF THE DRAWINGS

The present invention will be better understood when considered with the accompanying drawings wherein.

DETAILED DESCRIPTION OF THE PREFERRED EMBODIMENT

The process of the present invention is particularly well suited for recycling polyethylene drums and will be described in that context.

Figure 1:
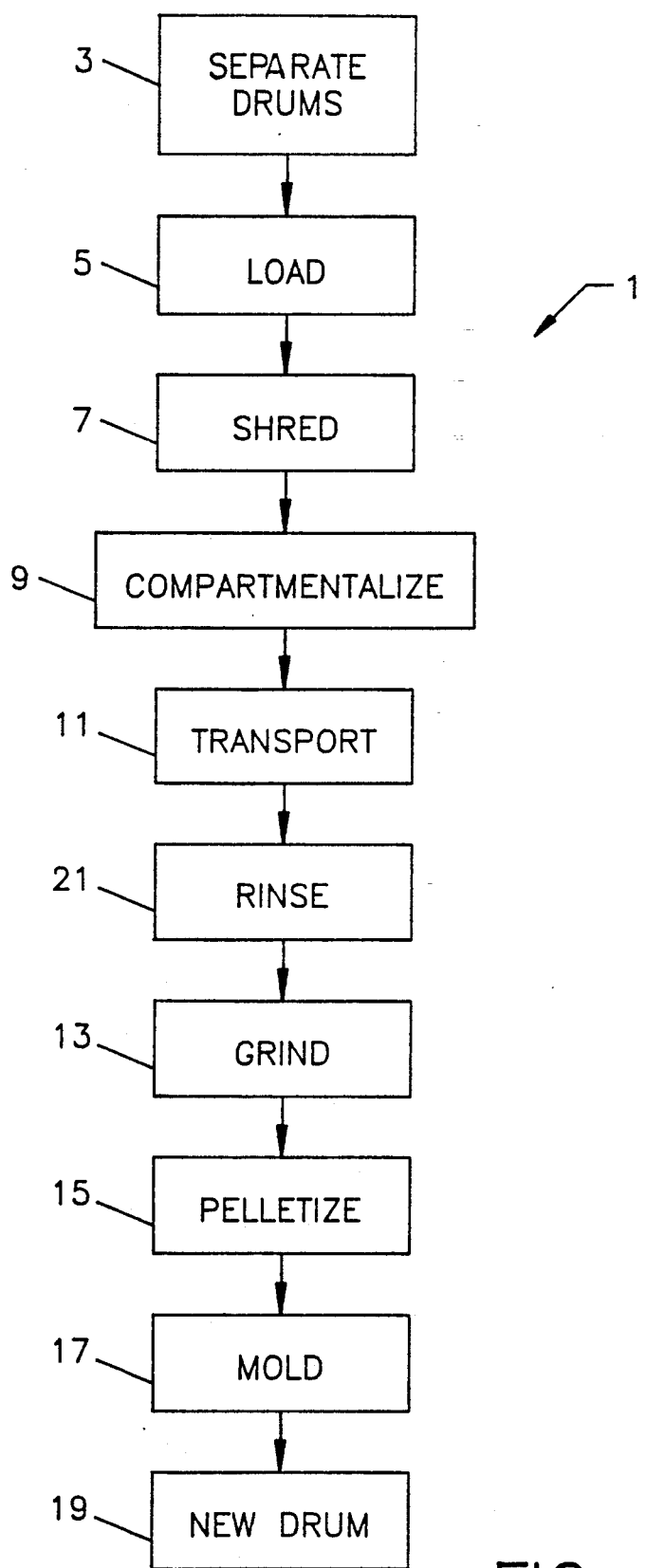
FIG. 1 is a schematic of the process of the present invention.

As seen in FIG. 1, the process 1 proceeds by first separating the drums 2 in the separation step 3, thereafter the loading 5, shredding 7 and compartmentalizing 9 steps are performed on site. Transporting 11 of the drums 2 for processing occurs when the containers 10 in which the drum shreddings 12 are compartmentalized are filed. Rinsing 21, grinding 13, pelletizing 15 and molding 17 into a new drum 19 occurs at a drum manufacturing facility.

Separation 3 of the drums is desirable to ensure that the shredded material 12 is uniform in polymer composition and color. In part, the intent of the recycling is to facilitate remolding 17 of the shredded material 12 into new drums 19. The means for separation is manual.

After the drums 2 are separated a single group of drums is loaded 5 onto a loading platform 14. The means for loading the drums 2 is either manual or by the use of a fork lift.

Figure 2:
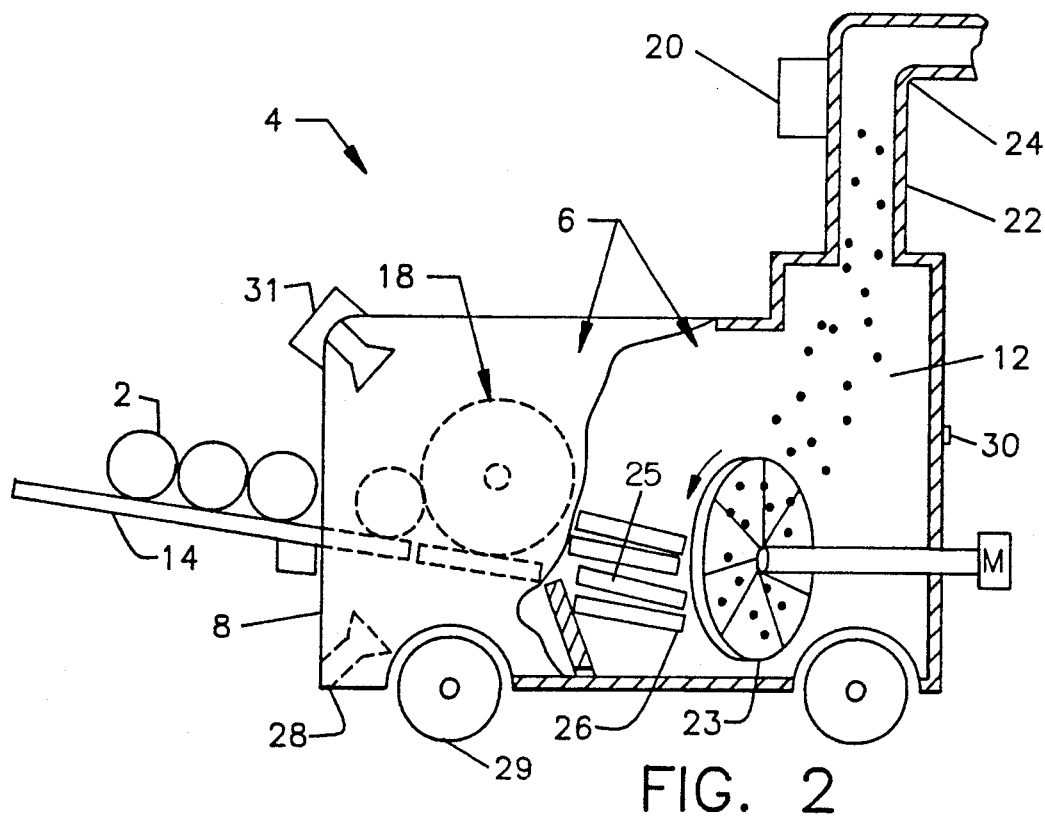
FIG. 2 is a cross-sectional view of the means used to load contaminated drums shred the drums and discharge the shreddings.

As illustrated in FIG. 2, the shredding function 7 is performed by a tree chipper 4 such as those available under the tradename "ASPLUNDH" or from Bandit Industries Inc. An illustrative tree chipper assembly 4 is comprised of a loading platform 14, a cutter blade assembly 18, a rotating disc cutter 23, a discharge conduit 22 and a blower 20 to provide the motive force for the shreddings 12 to pass through the conduit 22.

The loading platform or infeed chute 14 has a minimum length of thirty-six inches and an opening of approximately 1,000 square inches. There is a hydraulic feed system (not shown) which includes two powered feed wheels to move the drums 2 into the apparatus 4. The top feed wheel includes four plastic wear strips to ensure a smoother operation. The feed wheels have a feed rate of approximately 90 f.p.m. and are powered by a 3,000 PSI hydraulic pump. There is a shut-off bar 31 located on the infeed chute 14 which allows activation of the feed wheels in both the forward as well as the reverse direction.

The rotating disc cutter 23 is comprised of a cutting wheel and chipper knives. The cutting wheel is approximately forty inches in diameter and two inches thick. Two sets of the knives are mounted into the wheel approximately 180 degrees apart from each other. The chipper knives are double-edged, high carbon, high chrome steel knives. The knives are about four inches wide, ⅜ inch thick, and seven inches long.

The discharge conduit 22 has a radius of about twenty-four inches and is about eighty inches long. The conduit 22 has a 360° continuous swivel and an adjustable chip deflector. An adjustable elbow 24 is formed in the conduit 22 to facilitate selective delivery of the shreddings 12 to a particular compartment 32 in a trailer 10.

The shredding apparatus 4 is positioned on a mobile platform 8 that is approximately two feet by four feet. The platform 8 has at least two tires 29, safety chains, brake, tail, and directional lights, and a drainage pan 26 for residual liquids and materials as a result of the shredding process 7. The drainage pan 26 has an opening 28 to allow the liquid to be removed. A conventional fastening device 30 is mounted to the side of the mobile platform 8 to enable the platform 8 to attach to the trailer 10.

Figure 3:
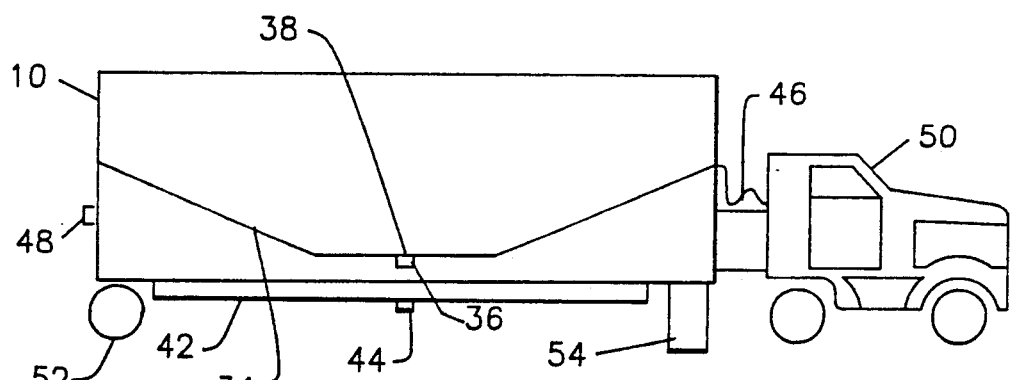
FIG. 3 is a sectional elevational view of the storage means.
Figure 4:
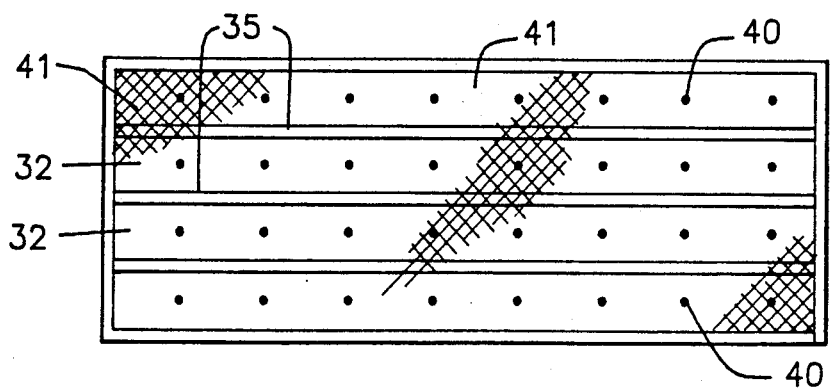
FIG. 4 is a top plan view of the storage means.

The compartmentalizing step 9 is performed in a trailer 10 provided with an inclined floor 34, separation walls 35 and a removable drain pan 42 which is set below the inclined floor 34. As shown in FIG. 4, the trailer 10 is divided into a plurality of lengthwise compartments 32. The divisions or compartments 32 allow a single trailer 10 to hold varying types of plastics as well as various colors, i.e. green, blue, red. The inclined floor 34 is provided with holes 40 arranged in an array. Preferably the holes 40 are one-half inch holes and are one foot apart. A mesh screen 41 shown in partial in FIG. 4 is provided to retain the shreddings in the trailer 10 and to allow the motive force air from the blower 20 to escape. As illustrated in FIG. 3, the floor 34 of the trailer 10 is slanted towards a drain 36 located in the center 38 of the floor 34. The holes 40 and the drain 36 allow excess residual liquids from the shreddings 12 to flow through into the retaining pan 42 under the floor 34 of the trailer 10. The retaining pan 42 also has an opening 44 which allows the residual liquids to be removed.

The trailer 10 also has a plurality of rear axles on which wheels 52 are mounted and a pair of trailer stands 54 in the front of the trailer 10 upon which the trailer 10 rests. The trailer 10 also has fastening devices 46 and 48 attached to both the front and rear of the trailer 10.

When the trailer 10 is filled with shreddings 12 it is transported 11 to a remote location where the shreddings 12 are further ground 13 and pelletized 15. The pelletizer is a conventional compounding extruder. Once the shreddings 12 are all in pelletized form the pellets are molded 17 into new drums 19 to be used again for the storage of hazardous liquids and materials. The molding device is a conventional extrusion blow molding machine.

Before the recycling process 1 begins the trailer 10 is attached to the mobile platform 8 upon which the shredding assembly 4 is placed. The fastening device 30 mounted on the mobile platform 8 attaches to one of several rear fastening devices 48 on the trailer 10. This connection ensures that the trailer 10 is correctly aligned with the shredder 4 for the shreddings 12 to be projected into the trailer compartments 32 and that the trailer 10 maintains that position when the shredding apparatus 4 is blowing the shreddings 12 into the appropriate compartments 32 of the trailer 10. The trailer stands 54 are provided with a crank which enables the front end of the trailer 10 to be raised and the front fastening device 46 of the trailer 10 to attach to a tractor 50 which transports 11 the trailer 10 to a remote location for further processing when the trailer 10 is full.

After the contaminated liquids and/or materials are removed from the drums 2, the drums 2 must be sorted by the type of material and or the color of the material. Only one type of drum 2 should be shredded 7 in one shredding apparatus 4 at any one time. The drums 2 are loaded 5 onto the conveyor or chute 14 which brings the drums 2 into the shredding section of the apparatus 4. The loading 5 is performed either manually or by the use of a fork lift. There can be numerous apparatuses 4 shredding different types of drums 2 and compartmentalizing the shreddings 12 into the same trailer 10 but into different compartments 32 at the same time.

Once the drums 2 are loaded 5 into the shredding section 6 of the apparatus 4 the blades 18 inside the shredding section 6 begin to cut the drums 2 into sectional pieces 25. These sectional pieces 25 are then shredded into shreddings 12 by a rotating disc cutter 23. The size of the shreddings 12 is dependent on being small enough for compact transport but large enough to avoid blocking the apertures 40 located in the floor 34 of the trailer 10. Practice has shown that shreddings having dimensions between one half to one inch wide and two to ten inches long will compact well. Additionally, it may be necessary to spray a liquid such as a water and oil mixture onto the shreddings 12 to reduce the friction which may develop between the blades 18 and the shreddings 12. This liquid will also act as a preliminarily rinsing for the shreddings 12.

After the drums 2 are shredded, the shreddings 12 are directed into the blowing section of the apparatus 4 via the rotating disc cutter device 23. The rotating disc cutter device 23 not only reduces the size of the shreddings 12, but ensures that the shreddings 12 are continuously moving towards the blowing section and a backlog does not develop in the shredding section 6 of the apparatus 4 which can cause damage not only to the blades 18 but the whole apparatus 4. The shreddings 12 are projected out of the apparatus 4 via a blower 20. The blower 20 can be located at various locations along the conduit 22. Thus depending on the location of the blower 20, the blower 20 which projects the shreddings 12 into the trailer 10 may be a sucking/blowing device which first sucks the shreddings 12 into the conduit 22 and then blows the shreddings 12 out of the conduit 22 and into the trailer 10. The conduit 22 is arranged to pivot and has an elbow 24 located at the top of the conduit 22. The ability of the conduit 22 to pivot and the elbow 24 at the top of the conduit allow the conduit 22 to be positioned so that the shreddings 12 can be directed selectively into various compartments 32 of the trailer 10.

The retaining pan 42 should be emptied both prior to transporting the trailer 10 to the remote location as well as at the remote location because additional residual liquids may flow through the drain 36 when trailer 10 is moved.

When the trailer 10 is filled with shreddings 12 it is transported to a remote location. At the remote location, the shreddings 12 are vacuumed out of the compartments 32 of the trailer 10, rinsed 21 and are placed into a grinder which further grinds 13 and pelletizes 15 the shreddings 12 into pellets. These pellets then proceed to a conventional drum molder which molds the pieces into new clean drums which are again used to store hazardous liquids and materials. The molder and pelletizer are both conventional items known in the art.

Shredding 7 the contaminated drums 2 before the drums 2 are transported 11 to be recycled enables a trailer 10 to transport 11 the drums 2 in a much more condense manner. Consequently, the amount of shreddings 12 that a trailer 10 can transport is much greater than the number of drums 2 a trailer 10 would be able to transport when the drums 2 are in their normal shape.

By shredding and reconstructing the drums 2, harsh chemicals normally used to recondition the drums 2 are not used. Any remaining residual of hazardous liquids or materials located on the drums 2 are removed when the shreddings 12 are rinsed 21, ground 13, pelletized 15 and molded 17 into new drums 19.

We claim:

1. A process for shredding, transporting and reconstructing plastic containers in which materials were stored comprising the steps of:
    (a) placing temporarily a mobile means for shredding the containers and a mobile means for storing the shredded material at a location where the plastic containers are stored;
    (b) separating the containers based upon polymer type and color;
    (c) loading the separated containers into the mobile means for shredding the containers;
    (d) shredding the separated containers;
    (e) loading the shreddings into one of a plurality of storage compartments in the mobile means for storing the shredded material that is designated for the particular type of polymer and color;
    (f) transporting the mobile means for storing the shredded material to a remote location; and
    (g) reconstructing the separated and shredded material into containers at the remote location.

2. A process as in claim 1 comprising the further step of pelletizing the shreddings after the shreddings have been transported to the remote location.

3. A process as in claim 1 wherein the step of reconstructing the shredded material into containers is performed by the step from the group consisting of blow molding or injection molding.

4. A process as in claim 1 comprising the further step of attaching the storing means to the shredding means.

5. A process as in claim 1 comprising the further step of draining excess residual liquids and material from the shreddings while the shreddings are located in the means for storing shredded materials.

6. A process as in claim 1 comprising the further step of cleaning and further grinding the shreddings at the remote location.

7. A process as in claim 1 comprising the further step of replacing the storage means with another storage means when the storage means has been loaded with shreddings.

8. A process as in claim 1 comprising the further step of vacuuming the shreddings out of the storing means upon arriving at the remote location.

9. A system to shred, transport and reconstruct plastic containers comprised of:
    (a) a mobile means for shredding the containers at a location where the containers are stored;
    (b) a mobile means for storing and transporting the shreddings from the location where the containers are stored to a remote location for reconstruction, comprising a plurality of storage compartments for storing various types of shredded plastics and various colors of shredded plastics;
    (c) means for projecting the shreddings into one of the compartments of the mobile means for storing and transporting the shredded material;
    (d) means for transporting the means for storing and transporting the shredded material from the location where the plastic containers are stored and shredded to a remote location; and
    (e) means for reconstructing the shredded material into containers at the remote location.

10. A system as in claim 9 wherein the means for projecting the shredded material into the mobile storing and transporting means is comprised of a conduit and a blower.

11. A system as in claim 9 wherein the conduit has an elbow to selectively direct the shredded material into one of the plurality of storage compartments in the mobile means for storing and transporting.

12. A system as in claim 9 further comprising a mobile platform to mount the means for shredding containers, a fastening device attached to the side of the mobile platform and a retaining pan under the platform for residual liquids and materials.

13. A system as in claim 9 further comprising a slanted floor in the mobile means for storing and transporting the shreddings; an array of apertures in said slanted floor; and a retaining pan below the mobile means for storing and transporting the shredded containers to hold residual liquids and materials.

14. A system as in claim 13 further comprising fastening devices attached to the front and rear of the mobile means for storing and transporting the shreddings.

15. A system as in claim 9 wherein the mobile means for storing and transporting shredded containers is a trailer which is divided into compartments.

16. A system as in claim 15 wherein the compartments of the trailer are divided lengthwise.

* * * * *